No. 882,690. PATENTED MAR. 24, 1908.
T. N. JONES.
HOSE COUPLING.
APPLICATION FILED APR. 1, 1907.
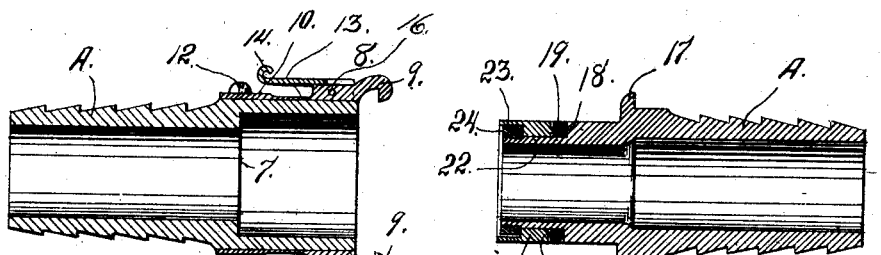
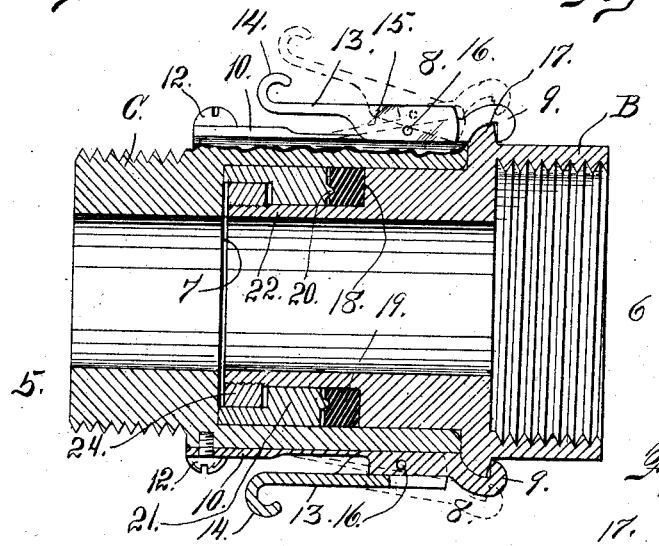
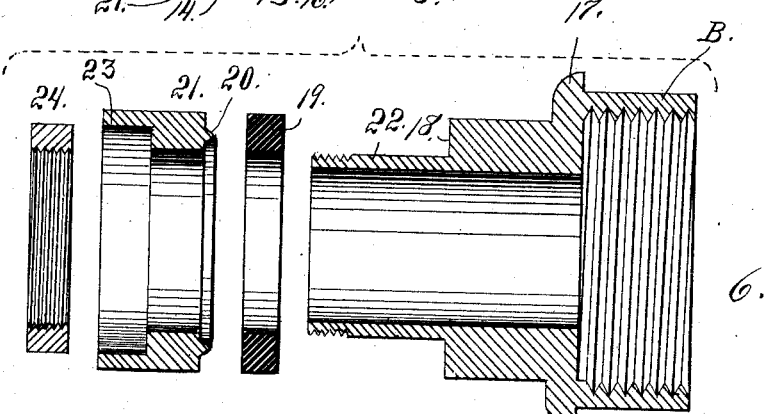
Witnesses
Otto E. Hoddick
Dena Nelson
Inventor
T. N. Jones
By
Attorney

UNITED STATES PATENT OFFICE

THEODORE N. JONES, OF BOULDER, COLORADO, ASSIGNOR OF ONE-HALF TO JOHN T. POWERS, OF HASTINGS, NEBRASKA, AND ONE-FOURTH TO N. S. SHANNON AND ONE-FOURTH TO W. H. FERGUSON, BOTH OF LINCOLN, NEBRASKA.

HOSE-COUPLING.

No. 882,690.    Specification of Letters Patent.    Patented March 24, 1908.

Application filed April 1, 1907. Serial No. 365,683.

*To all whom it may concern:*

Be it known that I, THEODORE N. JONES, a citizen of the United States, residing at Boulder, in the county of Boulder and State of Colorado, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hose couplings adapted for use either with garden or fire hose and may be employed either to connect the adjacent hose sections, or at the hydrant as may be desired.

The invention will now be described in detail reference being made to the accompanying drawing in which is illustrated an embodiment thereof. In this drawing, Figures 1 and 2 are sectional views showing the two members separated but in alinement for connection. Fig. 3 is a sectional view showing the two members connected. In this view the hydrant form of construction is employed. Fig. 4 is a sectional view showing in detail the four parts of the male member of the coupling.

The same reference characters indicate the same parts in all the views.

Let the numeral 5 designate the female member and 6 the male member of the coupling whether for use as a coupling for the hose members or for use at the hydrant. Where used for coupling hose sections, each member is provided with a corrugated tapering shank A, this portion being of ordinary construction. In the hydrant form of construction, the male member is provided with an interiorly threaded ring B at its outer extremity, while the female member is provided with an exteriorly threaded part C. The female member of the coupling is provided with an interior shoulder 7. This member is also provided with a spring locking device 8 having a projecting hook 9 and a rearwardly extending spring part 10 made fast to the coupling member by a screw 12 or other suitable fastening device. This spring locking hook is provided with an operating cam 13 having an upwardly-projecting extremity 14. This cam is provided with side flanges 15 which are connected with the hook by pivoted pins 16, so located that when the hooked extremity 14 of the cam is raised, the flanges of the cam forward of the pivot, bear against the coupling member and act as cams to lift the spring locking device sufficiently to detach its hook from the exteriorly-projecting circumferential flange 17 formed on the other member of the coupling.

The male member of the coupling is provided forward of the flange 17 with a shoulder 18 against which is seated a gasket 19 which is engaged by a rib 20 formed on the adjacent surface of a ring 21 which surrounds the forward extension 22 of the said member. This ring 21 is counterbored as shown at 23 to make room for a nut 24 which is threaded upon the forward extremity of the extension 22. This nut fits into the counterbore of the ring 21 and engages the shoulder at the bottom of the bore 23 locking the ring in place. This is the only function of the nut.

When the two coupling members are assembled, the forward extremity of the ring which projects slightly beyond the corresponding edge of the nut, engages the shoulder 7 of the female member. In this event the locking device 8 engages the collar 17 of the male member and locks the two members tightly together, the ring 21 being forced against the gasket 19 with sufficient force to expand the latter and make a water tight joint.

From the foregoing description the use and operation of my improved device will be readily understood without further description in detail.

Having thus described my invention, what I claim is:

1. A hose coupling composed of two members, one of the said members having an interior shoulder, the other member also having a shoulder, a gasket engaging said last named shoulder, the last named member having a forward extension beyond the gasket, a loose expanding ring applied to the gasket and surrounding the said extension, the said ring being counterbored at its outer end, and a nut inserted in the counterbore of the ring and engaging threads formed on the outer extremity of the extension of the said member, the said nut serving to lock the expansion ring in place, substantially as described.

2. A coupling composed of two coöperating members, one of which is provided with an interior shoulder, the other member having a gasket, a reduced extension projecting beyond the gasket, an expansion ring surrounding the said extension and engaging the gasket, and suitable means for retaining the expansion ring in place upon the member, whereby when the two parts are connected, the ring may be forced against the gasket whereby the latter is expanded to form a water tight joint.

3. A hose coupling composed of male and female members, the female member having an interior shoulder, and the male member having a gasket and a reduced extension projecting beyond the gasket, an expansion ring surrounding the said extension and engaging the gasket, said ring having an expanding rib on its gasket-engaging end, the outer extremity of the ring being counterbored around the extension, a nut inserted in the counterbore of the ring and connected with the extension which is exteriorly threaded for the purpose, the outer end of the ring normally projecting beyond the outer end of the nut, whereby when the two parts are connected, the said ring engages the shoulder of the female member whereby the ring is crowded against the gasket with sufficient force to form a water tight joint, substantially as described.

In testimony whereof I affix my signature in presence of two witnesses.

THEODORE N. JONES.

Witnesses:
   A. J. O'BRIEN,
   DENA NELSON.